United States Patent [19]
Kelman et al.

[11] Patent Number: 5,422,686
[45] Date of Patent: Jun. 6, 1995

[54] DETACHABLE EYEGLASS ASSEMBLY FOR VISORED HEADGEAR

[76] Inventors: Charles D. Kelman, 721 Fifth Ave., New York, N.Y. 10022; Diana S. Langley, 1105 Button Sage Way, Arroyo Grande, Calif. 93420; Bradford Stahl, 1332 Mireleste, San Luis Obispo, Calif. 93401

[21] Appl. No.: 59,493

[22] Filed: May 10, 1993

[51] Int. Cl.[6] .............................. G02C 3/00
[52] U.S. Cl. .................... 351/155; 351/158; 2/10
[58] Field of Search .............. 351/155, 153, 156, 140, 351/41, 158; 2/10, 11, 12, 13, 453

[56] References Cited

U.S. PATENT DOCUMENTS

| | | |
|---|---|---|
| 1,298,636 | 4/1919 | Altman ........................ 2/10 |
| 1,334,878 | 3/1920 | Young . |
| 1,514,111 | 11/1924 | Sutton . |
| 2,481,960 | 9/1949 | Wall et al. ................... 2/10 |
| 4,541,125 | 9/1985 | Phillips . |
| 4,869,586 | 9/1989 | Chung . |

Primary Examiner—William L. Sikes
Assistant Examiner—Hung Xuan Dang
Attorney, Agent, or Firm—Darby & Darby

[57] ABSTRACT

A detachable eyeglass assembly for a visored headgear includes a clip for removable attachment to the visor. The clip is adopted to extend from one side edge to the other side edge of the visor perpendicular to the wearer's frontal line of vision, and the visor is gripped or frictionally retained at it opposite side edges by the clip. An eyeglass member having a transparent portion connects to the clip by pivot means so as to be able to tilt up out of the user's line of vision. The length of the clips between the ends that grasp the side edges of the visor, is adjustable whereby the distance between the sunglass member and the user's eyes is selectable. The detachable sunglass assembly is useable on a variety of visored headgear.

19 Claims, 3 Drawing Sheets

DETACHABLE EYEGLASS ASSEMBLY FOR VISORED HEADGEAR

BACKGROUND OF THE INVENTION

This invention relates generally to eyeglasses and more particularly to sunglasses that are adjustably and removably attachable to the visor of a person's cap.

The need for sunglasses and disadvantages associated with conventional sunglasses are well known. Most sunglasses are similar to conventional eyeglasses or spectacles. There is generally a main frame, which includes a pair of lenses or a single continuous lens, and a pair of temple bars at opposite sides of the main frame. The temple bars rest on the wearer's ears or partially encircle the ears from above; the center of the main frame is adapted to rest on the user's nose. The temple bars are hinged to the main frame for folding into a position substantially parallel with the main frame or the temple bars may be set at right angles to the main frame for wearing.

Such sunglasses, including a main frame and temple bars are not convenient for use when playing golf. Typically golfers wear caps with visors. The standard sunglasses interfere with proper seating of the golf caps and vice versa. Also, in playing golf the player frequently moves his head up and down, i.e., before, during, and after, a swing. In addition, individual golfers have different facial and eye characteristics and have varying habits. Thus, the optimum position of sunglasses varies from golfer to golfer.

In the prior art, adaptations of conventional sunglasses have been made wherein the temple bars were eliminated and the main frame, with the desired tinted lenses, was attached to the headgear of the user. In many instances, these devices have the disadvantage of permanent attachment to the headgear, such that the sunglasses are always present, even when the need for sunglasses is absent. The sunglasses cannot be readily placed on a new cap when caps are changed. Also, some of the prior art pivotable sunglasses were so heavy and complex in construction that the cost of the pivot device could outweigh usefulness.

In many of the earlier devices, the distance between the sunglass frame and the user's eyes was not adjustable. This is of course disadvantageous as many users have a preference for such positioning of sunglasses.

What is needed is a relatively inexpensive, lightweight mounting for sunglasses that is simple and easily attached to a cap visor. Advantageously, such a device should provide lens tilting, readily adjustable spacing between the sunglass and the user's face, and simple attachment to the cap without need for tools or complex or expensive components.

SUMMARY OF THE INVENTION

It is an object of the invention to provide an improved sunglass assembly for visored headgear that has a construction which allows simple attachment to and detachment from the headgear, and is inexpensive to produce.

It is a further object of the invention to provide an improved sunglass assembly for visored headgear that permits positioning of the lens frame at any selected distance from the user's face within a predetermined range.

Another object of the invention is to provide an improved sunglass assembly for visored headgear that provides flip-up capability for the tinted lenses, whereby use of the sunglass feature may be interrupted without removing the sunglasses from the user's headgear.

Yet another object of the invention is to provide an improved sunglass assembly for visored headgear that provides both flip-up capability and adjustable positioning relative to the user's eyes in a simple low cost lightweight device.

A detachable sunglass assembly for attachment to a headgear in accordance with the invention includes mounting means or a clip for removable attachment to the visor, which extends at the front of the headgear. The clip extends from one side edge to the other side edge of the visor, that is, in the direction perpendicular to the wearer's frontal line of vision. The visor is gripped or frictionally retained at its opposite side edges by the clip.

A sunglass member having a tinted transparent portion for viewing therethrough is connected to the clip by pivot means that encircle the clip and also connect to the sunglass member.

The length of the clip, between the ends that grasp the side edges of the visor, is adjustable. Thus, a user can select a preferred position for the sunglass member. That is, the distance between the sunglass member and the user's eyes is selectable, and the detachable sunglass assembly in accordance with the invention is useable on a variety of visored headgear. The sunglass member is pivotably attached to the clip and thus is able to tilt up out of the user's line of vision and is translatable with the clip to adjust the distance between the sunglass member and the viewer's eyes.

The detachable sunglass assembly for visored headgear in accordance with the invention is light in weight and adjustable, but nevertheless provides a rigid structure when mounted to the headgear. Positioning and attachment of the sunglass assembly on the headgear is simple and readily adjusted. The sunglass assembly is easily removed from one headgear and applied to another headgear.

Further objects and advantages of the invention will be apparent from the following detailed description and drawings. The invention, accordingly, comprises the features of construction, combination of elements, and arrangements of parts which will be exemplified in the constructions hereinafter set forth, and the scope of the invention will be indicated in the claims.

BRIEF DESCRIPTION OF THE DRAWING

For a fuller understanding of the invention, reference is had to the following description taken in connection with the accompanying drawings, in which.

DESCRIPTION OF THE PREFERRED EMBODIMENTS

Figure 1:
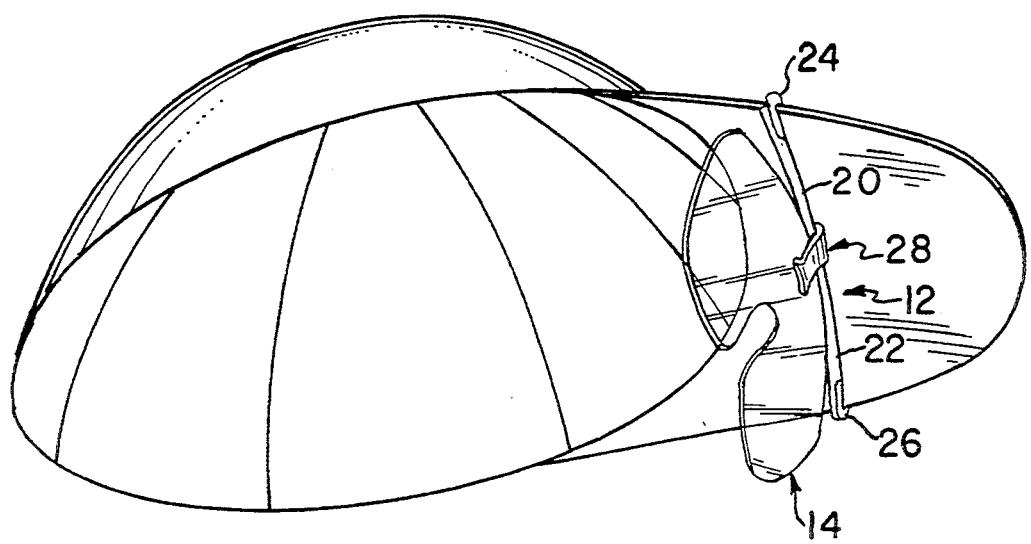
FIG. 1 is a bottom perspective view of a sunglass assembly in accordance with the invention, attached to a visored cap.

With reference to the Figures, a sunglass assembly 10 includes a clip 12, a sunglass member 14, which may be a single sheet of curved, tinted plastic or glass; or may be (not shown) a pair of individual tinted lenses surrounded by or joined together by a rigid supporting frame more typical of conventional eyeglasses and sunglasses. The sunglass assembly 10 is illustrated (FIG. 1) attached to the visor 16 of a cap 18.

The clip 12 is constructed of two identical half-clips 20,22, which are illustrated in a partially overlapped, mirror-image arrangement. A respective gripper 24,26 is at each end of the clip 12, that is, grippers 24,26 are respectively at the free ends of the half-clips 20,22. The distance between the grippers 24,26 is adjustable, as discussed more fully hereinafter.

Figure 2:
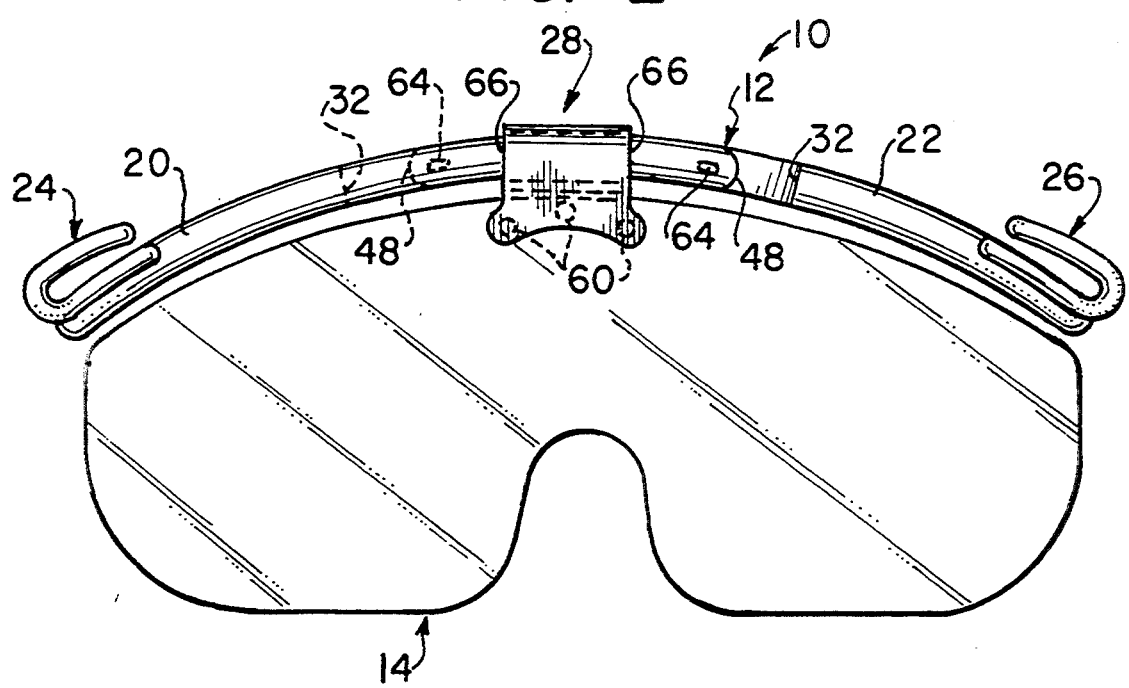
FIG. 2 is a front elevational view of the sunglass assembly of FIG. 1.
Figure 3:
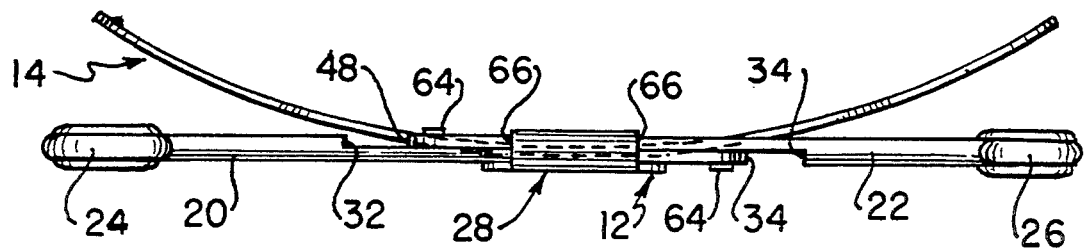
FIG. 3 is a top view of the sunglass assembly of FIG. 2.

Pivot means 28, that is, a single leaf hinge joins the sunglass member 14 to the clip 12 and allows the sunglass member 14 to be positioned as shown in FIG. 2 where it intercepts the user's line of vision when the sunglass assembly is attached to a visored cap 18. The sunglass member 14 may be pivoted on the hinge 28 to an elevated position (FIG. 4) where the sunglass member 14 (shown with broken lines) is substantially out of the line of vision of a user. The user's line of vision is represented by the arrow 30 in the FIGS. 1,3,4.

The clip 12 has a circular curvature (FIG. 2), at least in that portion between respective shoulders 32,34 on the half-clips 20,22. The shoulders limit the range of adjustment in the overall clip length between the grippers 24,26. That is, the shoulders 32,34 provides stops when the overlapped portions of the half-clips 20,22 are moved relative to each other.

The half-clips 20,22, as illustrated in FIGS. 5,5A–D, are identical components, although identity is not a necessity. Thus, the description of one half-clip 22 is equally applicable to the half-clip 20. A body 36 is circular in cross-section, and at the gripper 26 expands into a flat plate 38 that is backed by a semi-circular section 41 of the body 36. A finger 40 opposes the flat plate 38 and is connected to the plate 38 by an integral 180° return bend 42. In uses the visor 16 is gripped in the space 44 between the finger 40 and the flat plate 38. This space 44 necks down at the free end 46 of the finger 40 in order to pinch on the visor.

The half-clips, are made of a flexible materials for example, a plastic or metal, and a degree of yielding, that is, modification of the distance between the finger 40 and the plate 38 can occur as the visor is received in the space 44.

At a shoulder 34, there is a transition in cross-section of the body 36 from circular to semi-circular. This semi-circular construction extends to the free end 48 of the half-clip 22 to provide a flat surface 50 that is a segment of an annulus in shape.

When one of a pair of identical half-clips 20,22 is reversed in space with respect to the other, the flat surface 50 on one half clip 22 can abut the flat surface 50 on the other half clip 20. As the two flat surfaces 50 are each segments of a circular annulus, the two half-clips overlap with congruity to form, together, a circular cross-section, and to permit relative sliding adjustment of the distance between the grippers 24,26, without loss of the circular arc having the radius 52, regardless of the selected distance between grippers 24,26.

When the half-clips 20,22 are slid relative to each other so as to minimize the distance between the grippers 24,26, each of the free ends 48 of the half-clips abuts the respective shoulder 32,34 on the mating half-clip.

Thus, on a tapered visor 16 of a cap 18, the distance of the sunglass member 14 from the eyes of the user can be varied by adjusting the distance between the grippers 20,22. If the sunglass assembly is to be mounted far from the user's eyes, that is, where the visor 16 is narrow from side edge to side edge, the half clips 22,24 are translated relative to each other to bring the grippers closer together. On the other hand, if the user wants the sunglass assembly close to his/her face, it is only necessary to widen the distance between the grippers 24,26 so that the sunglass assembly may be attached to the visor 16 at a wider portion that is closer to the user's eyes.

The curvature of the clip 12, defined by the radius 52, is typical of the curvature found on visors 16 of conventional headgear 18. As the visors 16 are generally flexible, application of the clip 12 to the visor 16 will generally urge the visor to conform to the curvature of the clip 12. A precise alignment or concentricity of the clip 12 and the visor 16 is not required for effective use of the sunglass assembly 10 in accordance with the invention. A small discrepancy will, in fact, result in added gripping between the visor and clip 12.

The curvature (FIG. 3) in the sunglass member 14 is similar to that in the clip 12. Therefore, when the sunglass member 14 is tilted to a position (FIGS. 3,4) out of the direct line of vision 30 of the user, the sunglass member 14 generally nests in the curvature of the visor 16 and thereby is unobtrusive to the user.

The pivot means, that is, the single leaf hinge 28, includes a hollow cylinder 54 having a central opening 56 through which the clip 12 is passed. A leaf 58 extends tangentially from the cylinder 54 and to this leaf 58 the sunglass member 14 is attached in any convenient manner. For example, posts 60 extending from the leaf 58 pass through holes (not visible in the drawings) in the sunglass member 14. The ends of the posts 60 that protrude through the opposite surface of the sunglass member 14 are preferably spread after the sunglass member 14 is positioned, such that the sunglass member 14 is fixedly attached to the hinge 28.

In assembling the sunglass assembly 10, after attachment of the hinge 28 to the sunglass member 14, the ends 48 of the half-clips 20,22 are slipped through the opening 56 in the hinge 28 from opposite sides and the flat surfaces 50 are brought into abutment. The opening 56 is only slightly larger than the circular cross-section of the two overlapped half-clips 20,22 thus providing a slip fit (making allowance for the curvature of the clip 12 and permitting the hinge 28 to pivot on the clip 12 about the axis 62), but sufficiently snug so as to frictionally retain the sunglass member 14 in either of the positions shown in FIG. 4.

Positioning of the half-clips within the opening 56 of the hinge 28 keeps the half-clips from transversely separating, one from the other. Further, the grasp of the grippers 24,26 on the visor 16, and the enclosing of the half-clips by the hinge 28, stabilize the clip 12 longitudinally, in use. Additionally, nibs 64 on the half-clips 20,22 act as impediments to lengthwise separation of the half-clips by making contact with the edges 66 of the hinge 28. Nevertheless, the flexible nature of the various elements and the tapered shape of the nibs 64 allows the nibs 64 to slide through the central opening 56 when the parts are assembled together.

Figure 8:
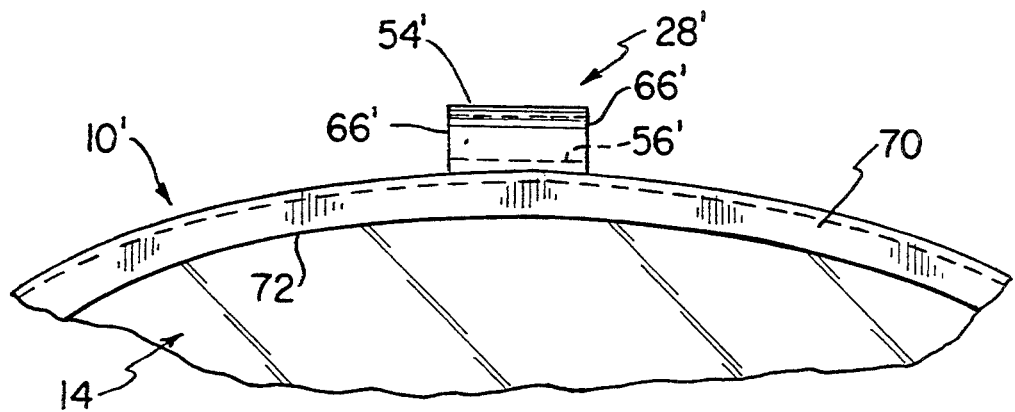
FIG. 8 is a partial front elevational view of an alternative hinge in a sunglass assembly in accordance with the invention.

The hinge 28 in an alternative embodiment may be a flat strip member which is bent 180° and welded or glued together at assembly, before or after the half clips 20,22 are inserted. In another alternative embodiment of a sunglass assembly 10' in accordance with the invention (FIG. 8), a hinge 28' has a reinforcing bar 70 extending laterally in both directions from a central hollow cylinder 54'. The bar 70 attaches to the upper edge of the sunglass member 14 and adds strength and rigidity to the sunglass assembly, for example, under windy conditions. An abutting connection between the hinge 28' and the sunglass member 14 may be effected using, for example, posts 60 (as in FIG. 2), screw fasteners, or an adhesive (not shown). Further, the bar 70 may have a channel or track (not shown) recessed in its lower edge 72, in which track the upper edge of the sunglass member 14 is nested and fastened, for example, using an adhesive. The cylinder 54',56',66' is similar in construction and operation to the cylinder 54 in FIGS. 1–7.

The bar 70 may extend laterally a short distance in both directions from the cylinder 54', or, preferably, the bar 70 may extend as far as the lateral edges 74 of the sunglass member 14, and may even extend downwardly at the edges (FIG. 2) to further encompass and rigidize the sunglass member 14.

Figure 4:
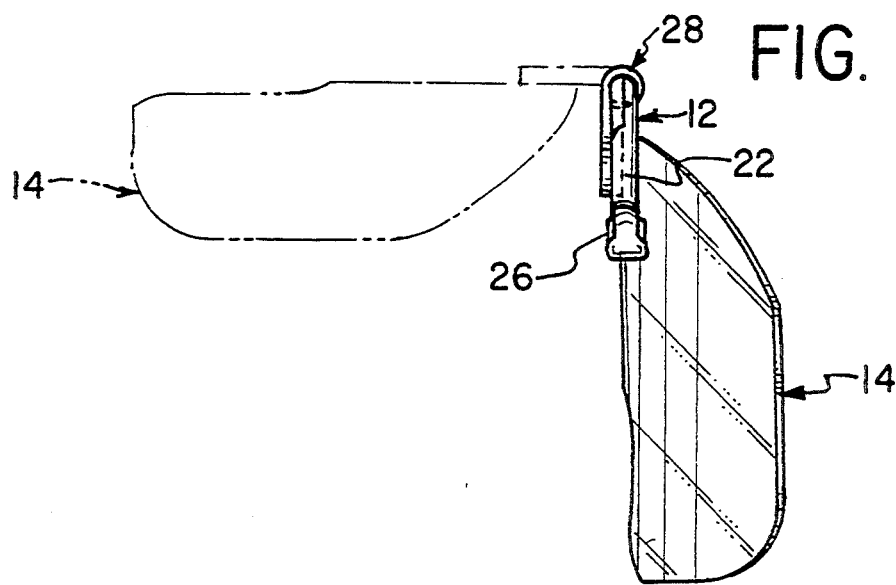
FIG. 4 is a side elevational view of the sunglass assembly of FIG. 2.
Figure 5:
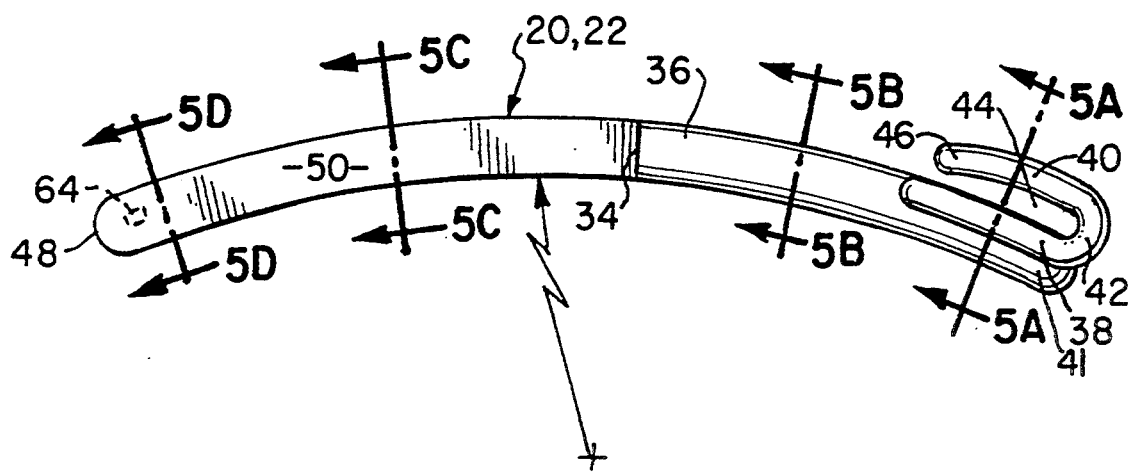
FIG. 5 is a detail of the clip in the sunglass assembly of FIG. 2.
Figure 5A:
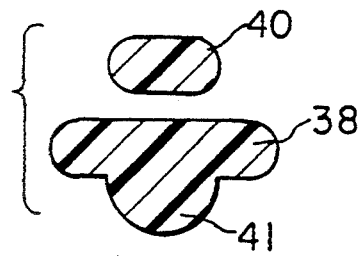
FIGS. 5A-5D are sectional views taken in FIG. 5.
Figure 5B:
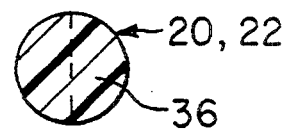
Figure 5C:
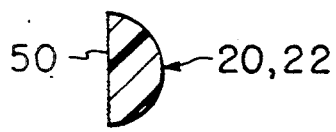
Figure 5D:
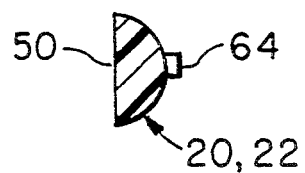
Figure 6:
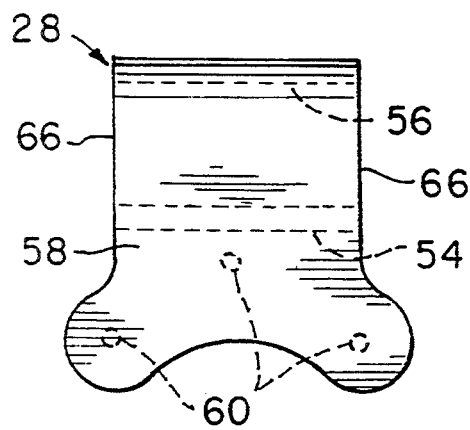
FIG. 6 is a front elevational view of the lens holder of FIG. 2.
Figure 7:
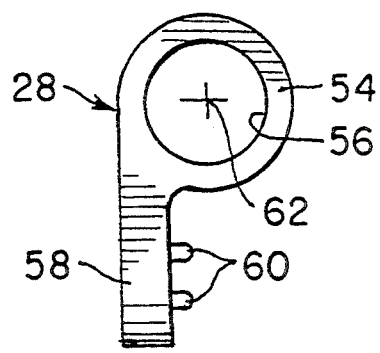
FIG. 7 is a side elevational view of the lens holder of FIG. 6.

The bar 70, regardless of lateral extension, is doubly curved to nest, with the lens member 14, in the curvature of the visor 16, when the sunglass assembly 10' is in either of the pivoted positions illustrated in FIG. 4.

Satisfactory performance has been achieved with sunglass assemblies 10,10' in accordance with the invention (FIGS. 1–8), whereby the structural integrity of the sunglass assembly 10,10' is maintained by engagement of the grippers with the visor 16 of a cap 18, and by the constraint provided by the hinge 28,28' at the overlapped portions of the half-clips.

Whereas in the embodiment of FIGS. 1–8, the half clips 20,22 overlap to form a circular cross-section, the central portion of the clip 12 need not have a circular cross-section but may have a polygonal cross-section (not shown). Then, the central opening 56,56' of the hinge 28,28' may have a polygonal cross-section which is complementary to the cross-section at the center of the clip 12. Such polygonal surfaces form "stops" at the vertical and horizontal tilt positions of the sunglass member 14, so that these positions are more easily maintained, for examples under windy conditions.

In an alternative embodiment in accordance with the invention, the half clips may have slots (not shown) through the flat surfaces 50 with a screw fastener extending through the slots and being tightened at any desired relative position of the two half clips. In another embodiment (not shown) one half-clip may have a series of holes spaced uniformly along the length of the flat surface 50 whereas the other half-clip may have an extended pin that mates in any one of the holes, which is selected based upon the desired spacing between the grippers.

In another alternative embodiment (not shown) radially oriented teeth may be provided on the "flat" surfaces 50 so that there is inter-engagement when the half-clips are overlapped, adjustment of the distance between the grippers being made in steps that are dependent upon the pitch of the teeth.

In addition to the many overlapped arrangements of half-clips, as discussed above, half-clips may, in alternative embodiments (also not shown), be adjustably joined with a telescoping arrangement at the center of the clip.

It will thus be seen that the objects set forth above, and those made apparent from the preceding description, are efficiently obtained, and, since certain changes may be made in the above constructions without departing from the spirit or scope of the invention, it is intended that all matter contained in the above description, or shown in the accompanying drawings, shall be interpreted as illustrative and not in a limiting sense.

What is claimed is:

1. An eyeglass assembly for attachment to a headgear having a visor with opposite side edge portions extending forwardly, comprising:

clip means for removable attachment to said opposite side edge portions, said clip means including a pair of gripper means for respectively grasping the opposite side edge portions of the visor, and a central member extended and connected between said pair of gripper means;

an eyeglass member having a transparent portion for viewing therethrough; and connecting means for connecting said eyeglass member to said clip means in a first position in which, in use, the transparent portion intercepts the line of vision of the wearer of the headgear;

wherein said central member of said clip means extends through a central opening in said connecting means and is adjustable to vary the distance between said gripper means to accommodate visors of different widths and to accommodate different user preferences for spacing between said sunglass assembly and the eyes of the user, said eyeglass assembly being selectively attachable closer to and farther from the user's eyes.

2. An eyeglass assembly as in claim 1, wherein said connecting means for connecting said eyeglass member to said clip means includes hinge means for pivoting said eyeglass member between said first position and a second position in which said transparent portion is tilted substantially out of said line of vision.

3. An eyeglass assembly as in claim 2, wherein said central opening of said connecting means extends through said hinge means so that said hinge means encircles said clip means central member, said hinge means being pivotable on said clip means by rotation about a longitudinal axis of said cylinder, said connecting means further including an extension from an outer surface of said hinge means, said eyeglass member being connected to said hinge means at said extension, whereby said eyeglass member is pivotable with said hinge member between said first position and said second position of said eyeglass member.

4. An eyeglass assembly as in claim 3, wherein said extension is elongated and extends in both directions away from said cylinder for engagement with a top edge of said eyeglass member.

5. An eyeglass assembly as in claim 4, wherein said extension is a reinforcement means and, in said first position of said eyeglass member, said reinforcement means extends along said top edge to substantially the opposite outer side edges of said eyeglass member, and is curved as viewed transversely to said line of vision and as viewed along said line of vision.

6. An eyeglass assembly as in claim 2 wherein said hinge means includes a centered pivoting portion and reinforcement means extending in both directions from said pivoting portion for engagement with a peripheral edge of said eyeglass member, whereby said connection of said eyeglass member to said clip means is reinforced.

7. An eyeglass assembly as in claim 1, wherein said central member of said clip means comprises first and second half-clips overlapped within said central opening of said connecting means, said first and second half-clips being movable with respect to one another to thereby adjust the distance between said gripper means, said connecting means holding together said first and second half-clips.

8. An eyeglass assembly as in claim 7, wherein each said half-clip of said central member of said clip means is arcuate in shape, said half-clips having the same radius of curvature, and said transparent portion is tinted for forming a sunglass assembly.

9. An eyeglass assembly as in claim 7, wherein said connecting means for connecting said eyeglass member to said clip means includes hinge means for pivoting said eyeglass member between said first position and a second position in which said transparent portion is tilted substantially out of said line of vision, said central opening of said connecting means extending through said hinge means so that said half-clips are overlapped within and held together by said hinge means.

10. An eyeglass assembly as in claim 9, wherein said clip means includes a pair of elongated half-clips slidingly overlapped at the center of said clip means to permit adjustment of the distance between gripper means, said half-clips having a slip fit in said central opening extending through said hinge means such that said hinge means holds together said overlapped half-clips, each said half-clip further comprising a respective nib projecting from each said half-clip near the center of said clip means, said nibs being positioned on said half-clips to contact said hinge means and limit relative longitudinal sliding of said half-clips at a predetermined maximum spacing between said gripper means.

11. An eyeglass assembly as in claim 1, wherein said central member of said clip means includes a first half-clip and a second half-clip, each said half-clip being of extended length and having one of said gripper means at one end, the other ends of said half-clips being releasibly joined together proximate the center of said clip means at any one of a plurality of relative positions, whereby a desired distance between said gripper means is selected.

12. An eyeglass assembly as in claim 11, wherein said first half clip and said second half-clip are joined together in overlapped relationship.

13. An eyeglass assembly as in claim 12, wherein each of said first and second half-clips has a flattened surface, said first and second half-clips being joined together at their flattened surfaces within said central opening of said connecting means.

14. An eyeglass assembly as in claim 13, wherein the combined circumferential surface of said first and second half-clips complements the internal surface of said central opening of said connecting means.

15. An eyeglass assembly as in claim 13, each said first and second half-clip further including a shoulder at the end of said flat surface adjacent said gripper means, said shoulder limiting relative longitudinal sliding of said half-clips at a predetermined minimum spacing between said gripper means.

16. An eyeglass assembly as in claim 11, wherein said first half clip and said second half clip are each circularly arcuate along their lengths, at least at the center of said clip means where said half-clips are releasibly joined, said half-clips each having the same radius of curvature at said clip means center, such that the curvature of said clip means remains constant during movement of said half-clips relative to one another.

17. An eyeglass assembly as in claim 1, wherein each of said gripper means includes a first surface and a second surface, said surfaces being substantially parallel and opposed to each other and connected together at respective ends to form a U-shape for receiving therein one of said opposite edge portions of said visor.

18. An eyeglass assembly as in claim 17, wherein said U-shape is resilient and includes a necked-down portion in said U-shape for pinching said visor edge portion therebetween.

19. An eyeglass assembly as in claim 1, wherein said eyeglass member is a unitary transparent pane located, when said eyeglass member is in use in said first position thereof, in a curved plane perpendicular to the path of the wearer's field of vision, when viewed from above, and has an upwardly convex curved top edge when viewed along said line of vision, said curved top edge being connected to said hinge means.

* * * * *